United States Patent [19]
Ohmori et al.

[11] Patent Number: 5,428,583
[45] Date of Patent: * Jun. 27, 1995

[54] MAGNETO-OPTICAL DISC RECORDING/REPRODUCING APPARATUS

[75] Inventors: Kiyoshi Ohmori, Kanagawa; Tetsu Watanabe, Tokyo; Katsuhiro Seo, Tokyo; Junichi Kudo, Tokyo, all of Japan

[73] Assignee: Sony Corporation, Tokyo, Japan

[*] Notice: The portion of the term of this patent subsequent to Jul. 12, 2011 has been disclaimed.

[21] Appl. No.: 966,682

[22] Filed: Oct. 26, 1992

[30] Foreign Application Priority Data

Oct. 31, 1991 [JP] Japan .................................. 3-311524

[51] Int. Cl.⁶ .......................................... G11B 13/04
[52] U.S. Cl. ........................................ 369/13; 369/47; 369/75.1
[58] Field of Search ............... 369/13, 75.1, 219, 249, 369/47; 360/114, 59

[56] References Cited

U.S. PATENT DOCUMENTS

| | | | |
|---|---|---|---|
| 4,819,109 | 4/1989 | Okada et al. | 360/106 |
| 4,823,336 | 4/1989 | Inada et al. | 369/215 |
| 4,914,647 | 4/1990 | Ono et al. | 369/77.2 |
| 4,993,009 | 2/1991 | Shiho | 369/13 |
| 5,025,335 | 6/1991 | Stefansky | 360/97.01 |
| 5,025,436 | 6/1991 | Crain et al. | 369/77.2 |
| 5,027,334 | 6/1991 | Yamanaka et al. | 369/13 |
| 5,070,494 | 12/1991 | Emoto et al. | 369/13 |
| 5,091,898 | 2/1992 | Bessho et al. | 369/77.2 |
| 5,115,423 | 5/1992 | Maeda | 369/112 |
| 5,122,998 | 6/1992 | Mizuno et al. | 369/13 |
| 5,124,971 | 6/1992 | Nomura et al. | 369/215 |
| 5,132,944 | 7/1992 | Berg | 369/13 |
| 5,138,599 | 8/1992 | Fukushima et al. | 369/54 |
| 5,138,605 | 8/1992 | Shtipelman et al. | 369/215 |
| 5,172,367 | 12/1992 | Hinotani | 369/215 |
| 5,187,702 | 2/1993 | Takahashi | 369/215 |
| 5,212,673 | 5/1993 | Honda | 369/44.15 |
| 5,220,543 | 6/1993 | Kuroda et al. | 369/13 |
| 5,229,900 | 7/1993 | Arai et al. | 360/99.02 |

FOREIGN PATENT DOCUMENTS

| | | |
|---|---|---|
| 56-74865 | 6/1981 | Japan . |
| 58-115659 | 7/1983 | Japan . |
| 61-267972 | 11/1986 | Japan . |
| 61-269267 | 11/1986 | Japan . |
| 61-280037 | 12/1986 | Japan . |
| 63-69076 | 3/1988 | Japan . |
| 64-86375 | 3/1989 | Japan . |
| 64-89068 | 4/1989 | Japan . |
| 4-90172 | 3/1992 | Japan . |
| 4-139654 | 5/1992 | Japan . |

*Primary Examiner*—Stuart S. Levy
*Assistant Examiner*—Paul J. Ditmyer
*Attorney, Agent, or Firm*—Charles P. Sammut; Limbach & Limbach

[57] ABSTRACT

A magneto-optical disc recording/reproducing apparatus in which a magneto-optical disc, a disc rotating and driving unit, an optical head device, an external magnetic field generating unit and a controlling device are contained as one in an outer casing. That is, the apparatus includes the disc rotating and driving unit which has a diameter of not more than 95 mm and in which the magneto-optical disc is housed and rotationally driven at a constant angular velocity, the optical head device for radiating a light beam to the magneto-optical disc, the external magnetic field generating unit arranged facing the optical head device with the magneto-optical disc in-between and adapted for applying a perpendicular magnetic field to the magneto-optical disc when recording information signals on the magneto-optical disc, the controlling device for controlling the disc rotating and driving unit, the optical head device and the external magnetic field generating unit and the outer casing having a width of not more than 101.6 mm, a depth of not more than 145 mm and a height of not more than 25.4 mm and adapted for accommodating the magneto-optical disc, the disc rotating and driving unit, the optical head device, the external magnetic field generating unit and the controlling device, for increasing the capacity for information signals and reducing the apparatus size.

7 Claims, 8 Drawing Sheets

MAGNETO-OPTICAL DISC RECORDING/REPRODUCING APPARATUS

BACKGROUND OF THE INVENTION

1. Field of the Invention

This invention relates to a recording/reproducing apparatus for a magneto-optical disc employed as a recording medium for information signals. More particularly, it relates to a recording/reproducing apparatus for a magneto-optical disc in which the magneto-optical disc, disc rotating and driving means, an optical head, an external magnetic field generating means and control means are accommodated and unified in an outer casing.

2. Description of the Related Art

There has hitherto been proposed a magneto-optical disc recording/reproducing apparatus into which a disc cartridge having the magneto-optical disc housed rotatably therein is loaded with the disc loaded therein for recording and/or reproducing information signals on or from the magneto-optical disc.

The magneto-optical recording/reproducing apparatus includes a loading unit for loading the disc cartridge with the magneto-optical disc loaded therein, a disc rotating and driving unit for holding the magneto-optical disc housed within the disc cartridge loaded in position for rotating and driving the disc, an optical head device for recording information signals on the magneto-optical disc rotationally driven by the disc rotating and driving unit or for reproducing information signals recorded on or from the magneto-optical disc, and an external magnetic field generating device arranged oppositely to the optical head device with the magneto-optical disc in-between for applying a magnetic field in a direction perpendicular to the magneto-optical disc for recording information signals on the disc.

A loading unit for loading the disc cartridge includes a cartridge holder arranged for holding the disc cartridge inserted into the main body of the apparatus in a state parallel to the bottom of the main body. The cartridge holder is adapted for being moved vertically within the main body of the apparatus by a cam mechanism etc. The loading unit holds the disc cartridge maintained by the cartridge holder in a horizontal direction with respect to the main body which is the direction extending parallel to the major surface of the magneto-optical disc. When the disc cartridge is at a position in which the center of the magneto-optical disc placed within the disc cartridge is substantially coincident with the center of rotation of the disc rotating and driving unit, the loading unit causes the disc cartridge to be lowered towards the disc rotating and driving unit. With the disc cartridge thus being lowered, the magneto-optical disc placed within the disc cartridge may be held on the disc table of the disc rotating and driving unit.

The optical head device is arranged within the main body of the apparatus in a position facing a signal recording surface on the major surface of the magneto-optical disc rotated by the disc rotating and driving unit. The optical head device is supported for being moved radially across the inner and outer peripheries of the disc. The optical head device is moved along the radius of the magneto-optical disc rotationally driven by the disc rotating and driving unit for enabling the light beam to be radiated on substantially the overall region of the signal recording surface of the magneto-optical disc for recording and/or reproducing information signals on substantially the entire signal recording surface of the magneto-optical disc.

The optical disc also includes an object lens driving unit for causing the light beam radiated towards the magneto-optical disc to follow in-plane deviations or offsets caused by the disc rotation by way of performing focusing servo and tracking servo control operations. The object lens driving unit supports the object lens, adapted for converging the light beam on the signal recording surface of the magneto-optical disc, by means of a supporting member, such as a resilient plate spring, for movement in two directions, that is in a direction along the optical axis of the object lens and in a direction at right angles thereto. Besides, the object lens driving unit causes the object lens to be moved along the optical axis of the object lens and in the direction at right angles thereto by electro-magnetic driving means.

The electro-magnetic driving means driving and moving the object lens is made up of a driving coil mounted on a lens bobbin supported by a supporting member for holding the object lens so as to be supplied with a driving current based on focusing and tracking error signals for effecting focusing servo and tracking servo, and a magnetic circuit for moving the object lens along the optical axis and in a direction at right angles thereto when the current flows through the driving coil.

The external magnetic field generating device, provided within the main body of the apparatus with the magneto-optical disc in-between, is adapted to approach the disc when recording information signals thereon for applying a perpendicular magnetic field to the disc.

Meanwhile, in the magneto-optical disc recording and/or reproducing apparatus provided with a loading unit adapted for loading the magneto-optical disc housed within the disc cartridge on the disc rotating and driving unit after the disc cartridge introduced into the main body of the apparatus is moved horizontally and then vertically with respect to the main body of the apparatus, the loading unit becomes complicated in structure to render it extremely difficult to simplify the various devices or units provided in the main body to reduce the size of the apparatus, while the assembling operation is rendered troublesome.

Besides, since the optical head device of the magneto-optical recording/reproducing apparatus has a unitary structure comprised of an optical block inclusive of a light source radiating a light beam, an object lens for converging the light beam on the magneto-optical disc and an object lens driving device for driving and moving the object lens, the optical head device is increased in size and weight, resulting in increased sizes of a driving unit for moving the optical head device and means for supporting the optical head device.

Meanwhile, it may be contemplated to use a magneto-optical disc of smaller size to reduce the size of the magneto-optical disc recording and/or reproducing apparatus. Although the main body of the apparatus may be reduced in size by employing a small-sized magneto-optical disc, a sufficient recording capacity of the information signals and hence the practical utility of the magneto-optical recording and/or reproducing apparatus aimed at a larger storage capacity cannot be assured.

OBJECTS AND SUMMARY OF THE INVENTION

It is an object of the present invention to provide a magneto-optical disc recording and/or reproducing apparatus whereby a larger volume of information signals can be recorded even if a magneto-optical disc of a smaller capacity is employed as a recording medium.

It is another object of the present invention to provide a magneto-optical recording disc recording and/or reproducing apparatus in which the mechanism of the apparatus is simplified to reduce the size of the apparatus itself to simplify the assembling operation.

It is a further object of the present invention to provide a magneto-optical recording disc recording and/or reproducing apparatus in which a magneto-optical disc of a large size as compared to a small size of the main body of the apparatus may be employed.

The present invention provides an optical disc recording and/or reproducing apparatus comprising an optical disc rotating and driving unit having an optical recording medium attached thereto and having a diameter not more than 95 mm, an optical head device for radiating a light beam to the optical disc, external magnetic field generating means facing the optical head device with the optical disc in-between, said external magnetic field generating means applying a perpendicular magnetic field when recording information signals on said optical disc, controlling circuit means for controlling said rotational driving means, the optical head device and the external magnetic field generating means, and an outer casing having a width of not more than 101.6 mm, a depth of not more than 145 mm and a height of not more than 25.4 mm and adapted for accommodating the optical disc, rotational driving means, optical head device, external magnetic field generating means and the controlling means.

With the magneto-optical recording and/or reproducing apparatus according to the present invention, the optical head device comprises a fixed optical system at least including a light source, a photodetector and optical elements for detecting focusing errors, a movable optical system including an object lens mounted movably radially of the optical disc with respect to the fixed optical system and adapted for converging a light beam from the light source to a signal recording part of the optical disc, and feed means for feeding the movable optical system radially of the optical disc.

With the magneto-optical recording and/or reproducing apparatus according to the present invention, the feed means comprises a pair of parallel guides for guiding the movable optical system radially of the optical disc and the optical head means comprises means for movably supporting the movable optical system along the parallel guides.

With the magneto-optical recording and/or reproducing apparatus according to the present invention, the object lens converging the light beam from the light source to the signal recording region of the disc is an aspherical lens.

With the magneto-optical recording and/or reproducing apparatus according to the present invention, the magneto-optical disc has a recording capacity of not less than 300 megabytes.

With the magneto-optical recording and/or reproducing apparatus according to the present invention, the magneto-optical disc, disc rotating and driving unit, optical head device, the external magnetic field generating device and the controlling circuit are accommodated as one in an outer casing having a width of not more than 101.6 mm, a depth of not more than 145 mm and a height of not more than 25.4 mm, and information signals are recorded on the magneto-optical disc comprising a disc substrate with a diameter of not more than 95 mm accommodated in the outer casing.

For recording/reproducing information signals on or from the magneto-optical disc, only the movable optical system of the optical head device is fed along the radius of the magneto-optical disc.

Other features and advantages of the present invention will become apparent from the following description.

DETAILED DESCRIPTION OF THE PREFERRED EMBODIMENT

Figure 1:
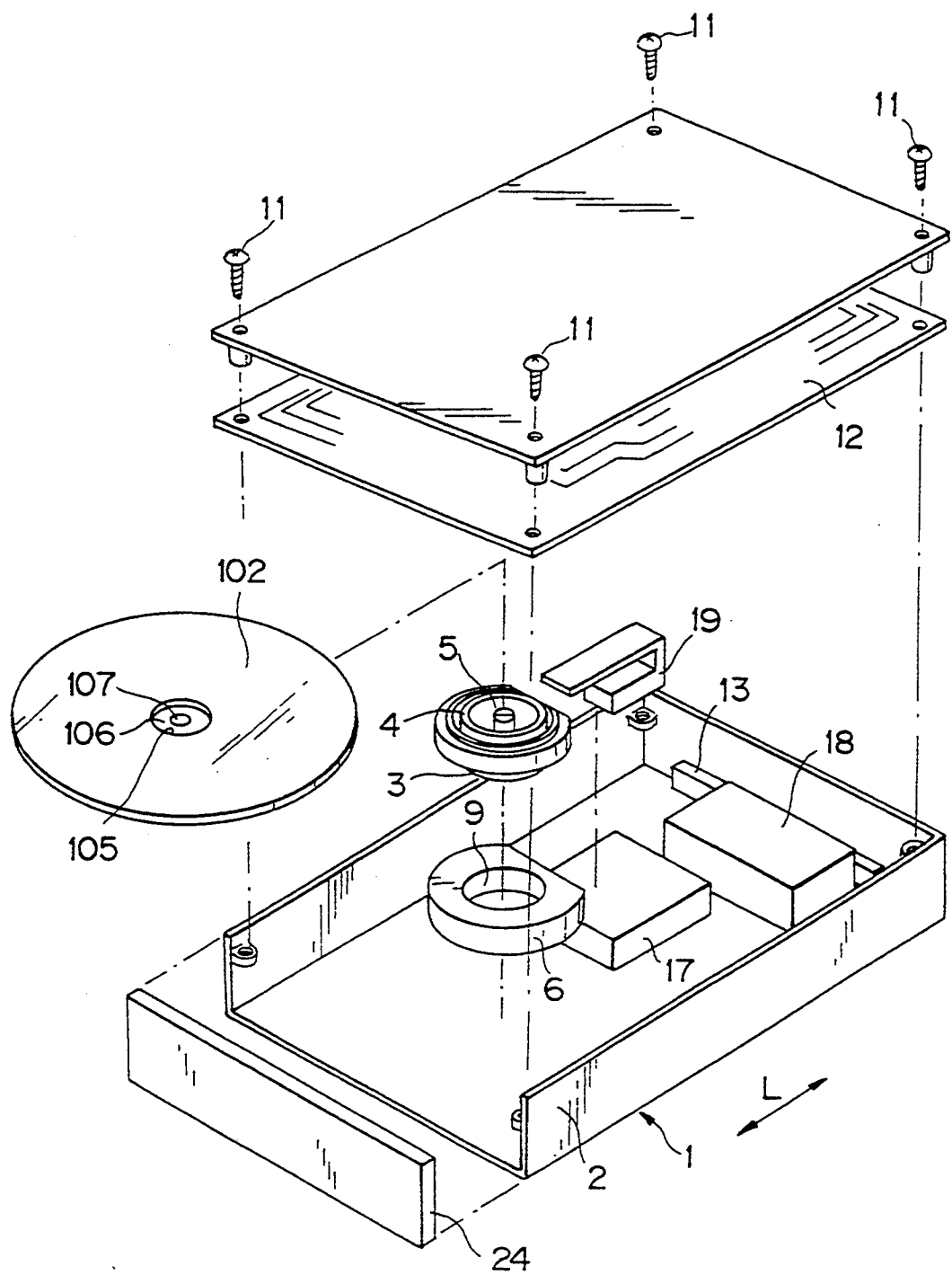
FIG. 1 is an exploded perspective view showing a schematic construction of the magneto-optical recording/reproducing apparatus according to the present invention.

Referring to the drawings, certain concrete embodiments of the present invention will be explained in detail.

Referring to FIG. 1, a magneto-optical disc recording/reproducing apparatus has an outer casing 1 providing a main body of the apparatus and a magneto-optical disc 102 for recording desired information signals thereon which is enclosed within the outer casing 1.

Figure 6:
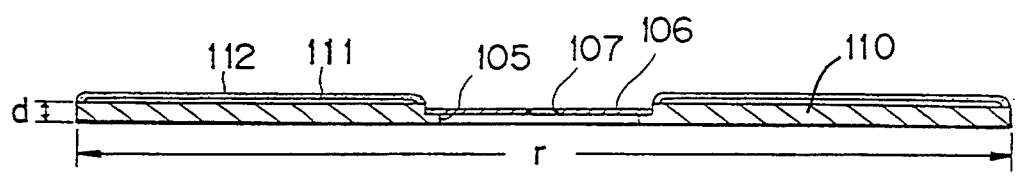
FIG. 6 is a cross-sectional view showing a magneto-optical disc of the recording/reproducing apparatus according to the present invention.
Figure 7:
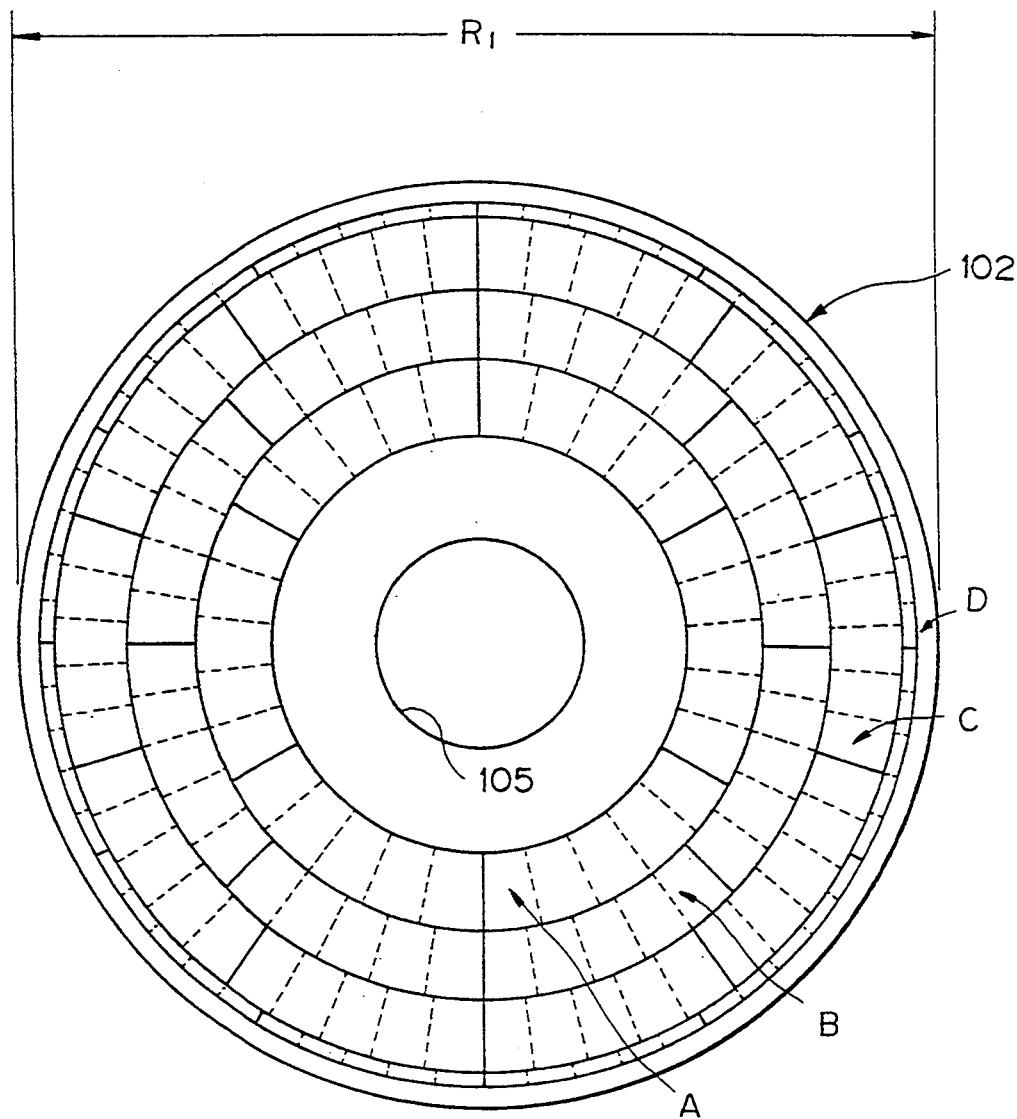
FIG. 7 is a schematic plan view showing a signal recording region of the magneto-optical disc shown in FIG. 6.

The magneto-optical disc 102 employed in the present invention includes a disc substrate 110 formed of a light-transmitting transparent synthetic resin, such as polyacetal resin, or glass, a major surface of which is coated with a magnetic material for forming a signal recording layer 111 which is in turn coated with a protective layer 112 formed of a synthetic resin, as shown in FIGS. 6 and 7.

A disc substrate 110 of the magneto-optical disc 102 has a thickness d of approximately 1.2 mm and a diameter r of 86 mm. The magneto-optical disc 102 comprised of the disc substrate 110 has a thickness equal to the sum of the thickness of the disc substrate 110 and those of the signal recording layer 111 and the protective film 112 and a diameter $R_1$ corresponding to the diameter of the disc substrate 110, or about 86 mm. The region of the above-mentioned major surface of the magneto-optical disc 102 on which the signal recording layer 111 is formed across its inner and the outer peripheries is designed as the signal recording region.

A hub attachment hole 105 is formed at the center of the magneto-optical disc 102, as shown in FIGS. 1 and 6. A disc hub 106 for holding the magneto-optical disc 102 on a disc table 23 of a disc rotating and driving unit is mounted in the hub attachment hole 105, as described subsequently. The disc hub 106 is formed as a disk of a magnetic material, such as metal, and mounted on the disc substrate by adhesion, welding etc. with its center coincident with the center of the magneto-optical disc 102. The disc hub 106 has a centering hole 107 having its center coincident with the center of curvature of a helically extending recording track(s) formed on the signal recording surface of the magneto-optical disc 102.

Figure 2:
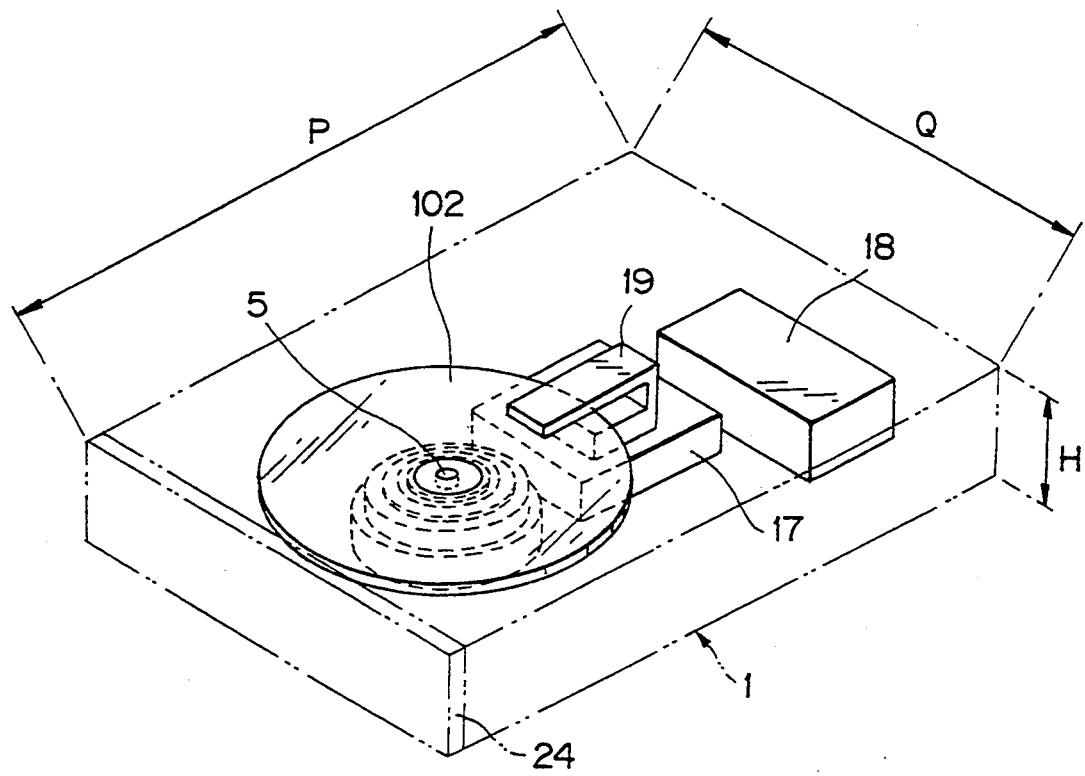
FIG. 2 is a schematic perspective view showing the inside of the apparatus shown in FIG. 1.
Figure 3:
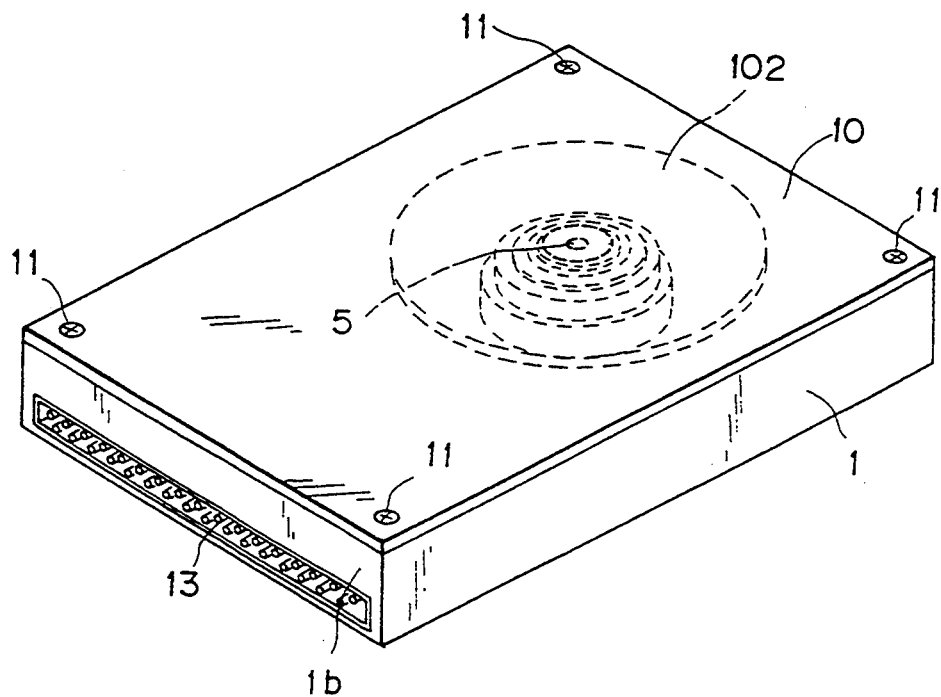
FIG. 3 is a perspective view showing a schematic construction of the apparatus shown in FIG. 1.

The outer casing 1 providing the main body enclosing the above-described magneto-optical disc therein is formed as a rectangular casing, as shown in FIGS. 1 to 3, and has a chassis providing a bottom plate of the outer casing 1 at a bottom side thereof. The upper side of the outer casing 1 facing the bottom side provided with the chassis 2 is closed by an upper cover 10 which provides an upper wall and which is removably attached to the outer casing by screws 11. The outer casing 1 has its front side opening 1a closed by a front panel 24.

The outer casing 1, inclusive of the front panel 24, has the shape of a rectangle having a width Q of 101.6 mm or less, a depth P of 145 mm or less and a height H of 25.4 mm or less, as shown in FIG. 2. More precisely, the outer casing 1 is in the form of a parallelepiped having the width Q of 101.6 mm, the depth P of 145 mm and the height H of 18 mm.

Meanwhile, the height H of the outer casing 1 may be increased to 25.4 mm, depending on the height of the disc rotating and driving unit arranged within the casing 1.

Rotating and driving means, optical head means and magnetic field generating means etc. are provided on the chassis 2 providing the bottom plate of the outer casing 1.

A spindle motor 3 constituting a disc rotating and driving unit for rotationally driving the magneto-optical disc 102 is provided on the chassis 2. The spindle motor 3 is supported on an annular supporting block 6 and mounted in this state on the chassis 2. That is, the spindle motor 3 has a motor housing fitted in a fitting hole 9 in the supporting block 6 and is supported in this state so that its spindle shaft 5 integral with its driving shaft is extended substantially at right angle to the chassis 2. At this time, the spindle shaft 5 has its distal end extended above the chassis 2.

On the spindle shaft 5 of the spindle motor 3, there is integrally mounted a disc table 4 which supports a disc hub 106 of the magneto-optical disc 102 and which is substantially equal in diameter to the disc hub 106. The magneto-optical disc 102 is mounted for rotation in unison with the disc table 4 by having the disc hub 106 supported on the disc table 4. The disc rotating and driving unit, comprising the magneto-optical disc 102 integrally mounted on the disc table 4, has an outside diameter equal to 86 mm corresponding to the outside diameter of the magneto-optical disc 102.

An optical pickup device, as optical head means, comprising an optical block 18 and an object lens driving unit 17, is provided at the back of the spindle motor 3. The optical pickup device plays the role of radiating a light beam to the magneto-optical disc 102 mounted on the disc table 4 for recording and/or reproducing information signals.

Figure 4:
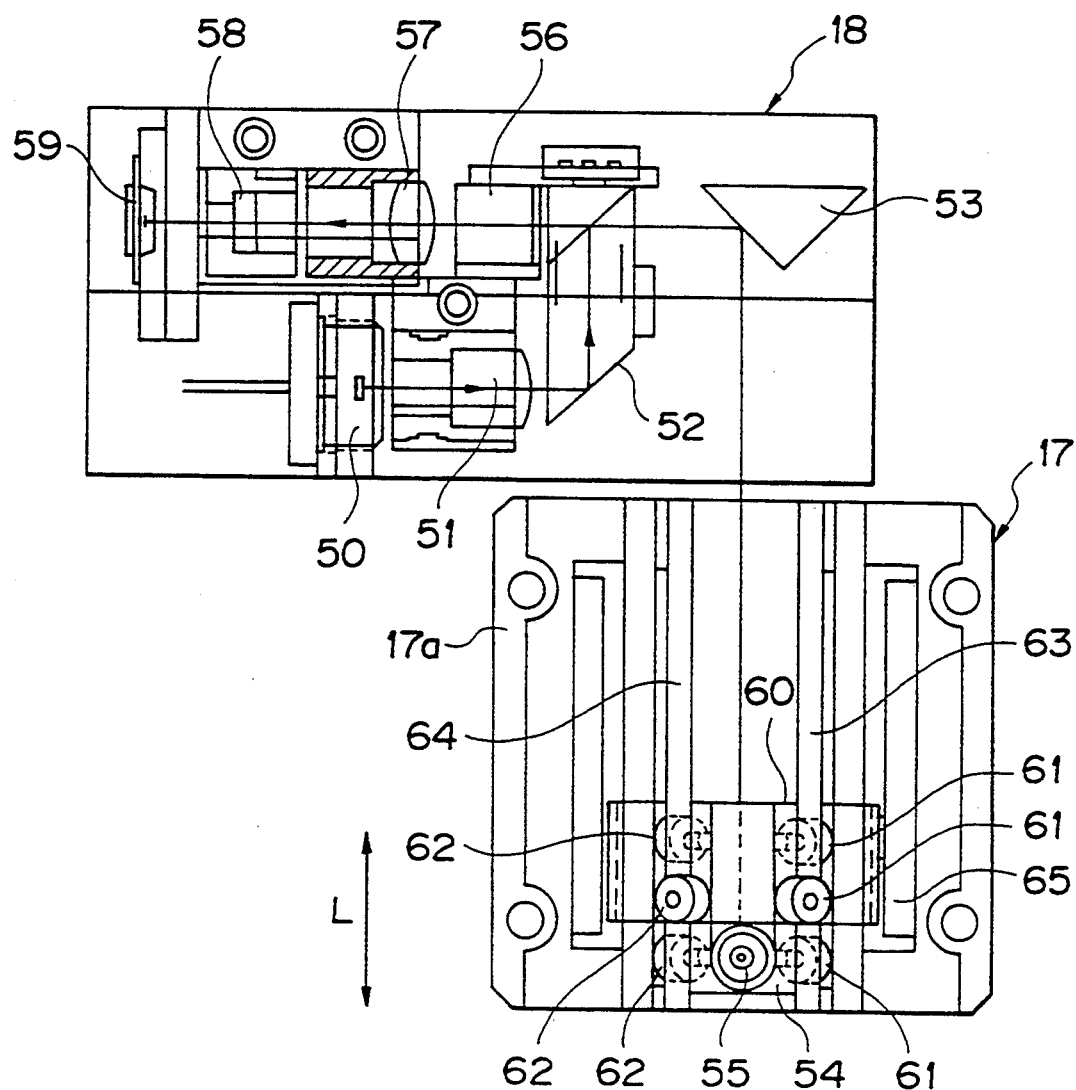
FIG. 4 is an enlarged plan view showing an optical pickup device of the recording/reproducing apparatus shown in FIG. 1, with a portion thereof being broken away.

The lens block 18, constituting the optical pickup device, includes a block, as a lens barrel or tube, within which there are accommodated a semi conductor laser 50 as a light source and plural optical components guiding a light beam radiated from the semiconductor laser 50, as shown in FIG. 4. A diffused light beam, radiated from the semiconductor laser 50, is incident in a collimator lens 51 in the optical block 18 and collimated by the collimator into a parallel light beam. The parallel light beam, transmitted through the collimator lens 51, is incident on a galvanomirror 53 via a beam splitter prism 52. The galvanomirror 53 is controlled by controlling means as later explained for deflecting and reflecting the parallel light beam incident thereon in accordance with predetermined control signals. The parallel light beam, reflected by he galvanomirror 53, is radiated by the optical block 18 before being incident on the object lens driving unit 17.

In the embodiment illustrated, the semiconductor laser 50 is adapted for radiating a light beam having a wavelength of 780

The object lens driving unit 17 has a frame 17a within which a pair of guide shafts 63, 64 are mounted parallel to each other and to the chassis 2. A lens bobbin block 60, as a movable optical system, is provided between these guide shafts 63, 64 so as to be guided by these shafts for movement in a direction along the chassis 2. The lens bobbin block 60 is supported by the guide shafts 63, 64 via three guide rolls 61, 61, 61; 62, 62, 62 provided on both lateral sides thereof facing the guide shafts 63, 64. That is, the three guide rolls 61, 61, 61 are provided on one lateral side of the lens bobbin block 60. Of these guide rolls, at least one roll is mounted on a supporting shaft extended obliquely upwards at 45' from the lens block 60, while the remaining two rolls are mounted on supporting shafts extended obliquely downwards at 45' from the lens block 60. These guide rolls 61, 61, 61 are adapted for rolling on and holding the guide shaft 63. Similarly to the guide rolls 61 , 61 , 61 , the guide rolls 62, 62, 62 are mounted on the other lateral side of the lens bobbin block 60. Of these guide rolls, at least one roll is mounted on a supporting shaft extended obliquely upwards at 45' from the lens block 60, while the remaining two rolls are mounted on supporting shafts extended obliquely downwards at 45' from the lens block 60. These guide rolls 62, 62, 62 are adapted for rolling on and holding the guide shaft 64.

The direction of movement of the lens block 60, that is the direction of extension of the guide shafts 63, 64, is the direction which interconnects an inner periphery of the magneto-optical disc 102 close to the spindle motor 3 and an outer periphery of the magneto-optical disc 102 spaced apart from the magneto-optical disc, as indicated by arrow L in FIG. 4. The lens bobbin block 60 is fed by a feed motor 65, arranged within the frame 17a of the object lens driving unit 17, by being guided by the guide shafts 63, 64. The feed motor 65 is comprised of, for example, a linear motor.

An object lens 55 is mounted facing the upper surface of the lens bobbin block 60. A reflecting mirror 54 is provided within the lens bobbin block 60 for reflecting the parallel light beam incident from the optical block 18 as a fixed optical system towards the object lens 55. That is, the parallel light beam, which is caused to fall by the optical block 18 on the object lens driving unit 17, is incident on the object lens 55 via a reflective mirror 54 and converged into a converged light beam which is radiated on the signal recording surface of the magneto-optical disc 102 on the disc table 4 so that its optical axis is parallel to the spindle shaft 5.

In the embodiment illustrated, the object lens 55 is an aspherical single lens having a numerical aperture NA equal to 0.55.

The light beam exited from the object lens 55 and radiated on and reflected by the magneto-optical disc 102 on the disc table 4 again is incident on the object lens 55 by which it is collimated and the collimated light beam is transmitted to and reflected by a reflective mirror 54 so as to be returned to the optical block 18. A photodetector for detecting the light beam reflected by the magneto-optical disc 102 is enclosed within the optical block 18. That is, the light beam returned from the object lens driving unit 17 to the optical block 18 is returned via galvanomirror 53 to beam splitter prism 52. The beam splitter prism permits the return light beam from galvanomirror 53 to fall on a Wollaston prism 56 without returning the beam to collimator lens 51. The Wollaston prism 56 is made up of two rectangular prisms, formed of a material exhibiting optical anisotropy, such as calcite or quartz, which are bonded together with the respective optical axes at right angles to each other. The light beam transmitted through the Wollaston prism 56 is transmitted through a converging lens 57, formed by a convex lens and a multiple lens 58 having a concave surface and an opposite cylindrical surface, before being received by a photodetector 59, such as a photodiode.

Depending on a light detection output, obtained on the basis of the return light beam from the magneto-optical disc 102 received by photodetector 59, a focusing error signal, indicating a deviation of the object lens 55 along its optical axis, which is a deviation of a converging point of the light beam converged by the object lens 55 from the signal recording surface of the magneto-optical disc 102, a tracking error signal, indicating a deviation of the object lens 55 along a direction normal to its optical axis, which is a deviation of a converging point of the light beam by the object lens 55 from a recording track formed on the signal recording surface of the magneto-optical disc 102, and playback signals which are information signals recorded on the recording track of the magneto-optical disc 102, may be produced.

Figure 5:
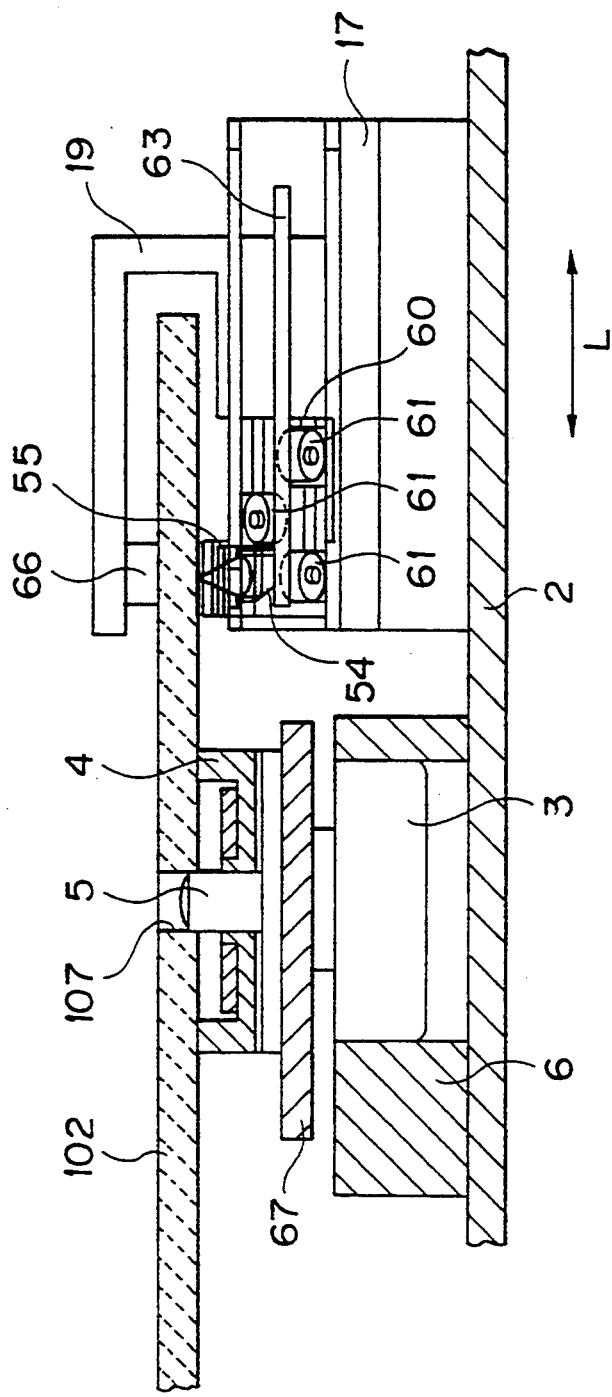
FIG. 5 is a side view showing essential parts of the recording/reproducing apparatus shown in FIG. 1, with a portion thereof being broken away.

A magnetic head device 66, constituting external magnetic field generating means, is mounted on the lens bobbin block 60 via a magnetic head supporting arm 19, as shown in FIGS.1 and 5. The magnetic head device 66 plays the role of applying a perpendicular magnetic field modulated in accordance with recording information signals when recording the recording information signals on the magneto-optical disc 102. The magnetic head supporting arm 19 has its proximal end supported by the lens bobbin block 60 so that the arm 19 may be moved in unison with the lens bobbin block 60. The magnetic head supporting arm 19 is so designed that the magnetic head device 66 carried by the end part of the arm 19 faces the object lens 55 of the lens bobbin block 60 with the magneto-optical disc 102 in-between. That is, the magnetic head supporting arm 19 is bent at a mid point substantially in the shape of a letter U so that its distal end faces the object lens 55. The magnetic head device 66 and the object lens 55 are spaced apart from each other by a distance which takes account of the thickness of the magneto-optical disc 102, the working distance of the object lens 55 and in-plane deviation of the magneto-optical disc 102, that is the deviation from the plane of the disc produced during disc rotation by the disc rotating and driving device. Meanwhile, the working distance of the object lens 55 is the distance from the foremost part to the focal point of the object lens 55.

Figure 10:
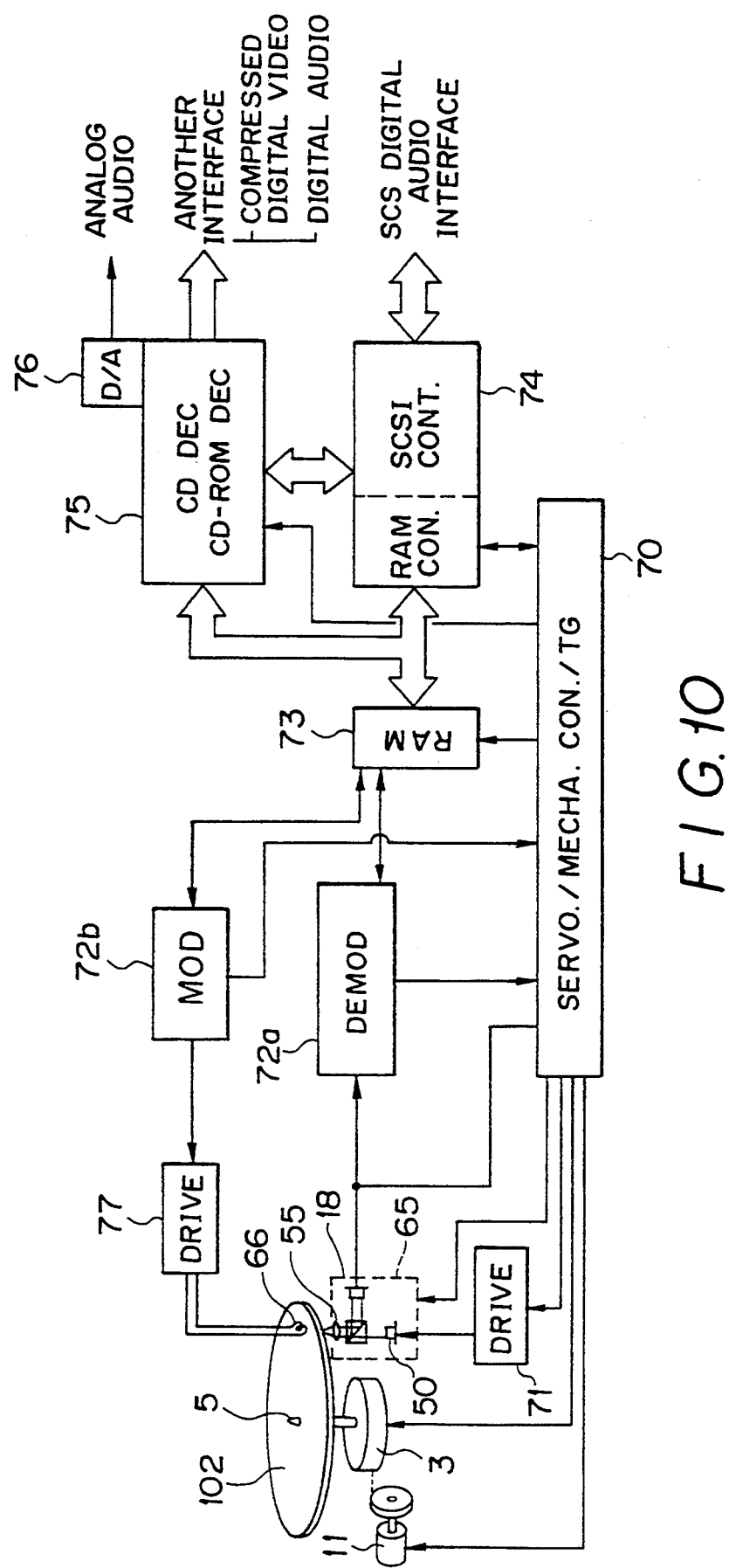
FIG. 10 is a block diagram showing the construction of a controller in the disc recording and reproducing apparatus.

In the magneto-optical disc recording/reproducing apparatus according to the present invention, there is provided a controlling device 70 for controlling the operation of the optical pickup device inclusive of the spindle motor 3 and the lens bobbin block 60 and the magnetic head device 66, based on various input control signals, as shown in FIG. 10. The control device 70 is built by packaging predetermined electronic circuit components on printed circuit board 12 provided on the inner surface of an upper cover 10 providing an upper wall of the outer casing 1, as shown in FIG. 1.

An operating signal inputted via an inputting device operated manually from outside of the magneto-optical disc recording/reproducing apparatus, an output signal from the optical pickup device, a detection signal indicating the rotational speed of the spindle motor 3 and a lifting motor 11, and a detection signal indicating the angular position of rotation, are entered to the controlling device 70. Consequently, in the present magneto-optical disc recording/reproducing apparatus, the tracking servo operation by the driving of the galvanomirror 53 provided within the optical block 18 of the optical pickup device, the focusing servo operation by driving control of the lift motor 11 and the spindle servo operation of maintaining a constant rotational velocity of the spindle motor 3, are performed on the basis of control signals from the controlling device 70.

A feed motor 65 feeds the lens bobbin block 60 in a direction along the radius of the magneto-optical disc 102 based on a detection output of the optical pickup device. Besides, the feed motor 66 feeds the object lens driving unit 17 to a desired position of the magneto-optical disc 102 in accordance with accessing instructions from the controlling device 70 which is operated on the basis of instructions from an external device, such as a host computer, via an input/output controller 74.

In the present magneto-optical disc recording/reproducing apparatus, an optical pickup driving circuit 71 is controlled by the controlling device 70 so that the output level of the semiconductor laser 60 is the playback level so that the information signals recorded on the magneto-optical disc 102 may be read out by the optical pickup device. The information signals recorded on the magneto-optical disc 102 and read out by the optical pickup device are supplied for demodulation to a modulation/demodulation circuit 72a which is control led by the controlling device 70. The information signals, demodulated by the modulation/demodulation circuit 72a, are stored in a memory device 73 controlled by the controlling device 70. The signals stored in the memory device 73 are outputted to various other external devices via a decoder 75 controlled by controlling device 70, while being outputted via a D/A converter 76 to the various other external devices as analog audio signals.

In the present magneto-optical disc recording/reproducing apparatus, the information signals inputted from the various external devices are stored in memory device 73 via input/output controller 74. The signals stored in memory device 73 are supplied to and modulated by magnetic field modulating circuit 72b. The signals modulated by the magnetic field modulating circuit 72b are supplied to a driving circuit 77 of the magnetic head device 66, while being used to control a driving circuit 71 for the semiconductor laser 50 for setting the output level of the semiconductor laser 50 of the optical pickup device to a recording level. Desired information signals are recorded on the signal recording region of the magneto-optical disc 102 by the optical pickup device and the magnetic head device 66.

The external devices, supplied with information signals outputted from the magneto-optical disc recording/reproducing apparatus, or supplying recording information signals to the magneto-optical disc 102, are connected to a connector 13 provided of a rear wall 1b of the outer casing, as shown in FIG. 3.

In the above-described magneto-optical disc recording/reproducing apparatus according to the present invention, when the spindle motor 3 is driven, the magneto-optical disc 102, mounted on the disc table 4, is rotationally driven at a constant angular velocity in synchronism with the disc table 4. The optical pickup device, made up of the optical block 18 and the lens bobbin block 17, and the magnetic head device 66, records information signals by radiating a light beam to the magneto-optical disc 102 rotationally driven by the spindle motor 3 and by applying a perpendicular magnetic field to the magneto-optical disc. Besides, the information signals previously recorded on the magneto-optical disc 102 may be reproduced by radiating a light beam from the optical pickup device to the magneto-optical disc 102 without applying the perpendicular magnetic field from the magnetic head device 66.

Figure 8:
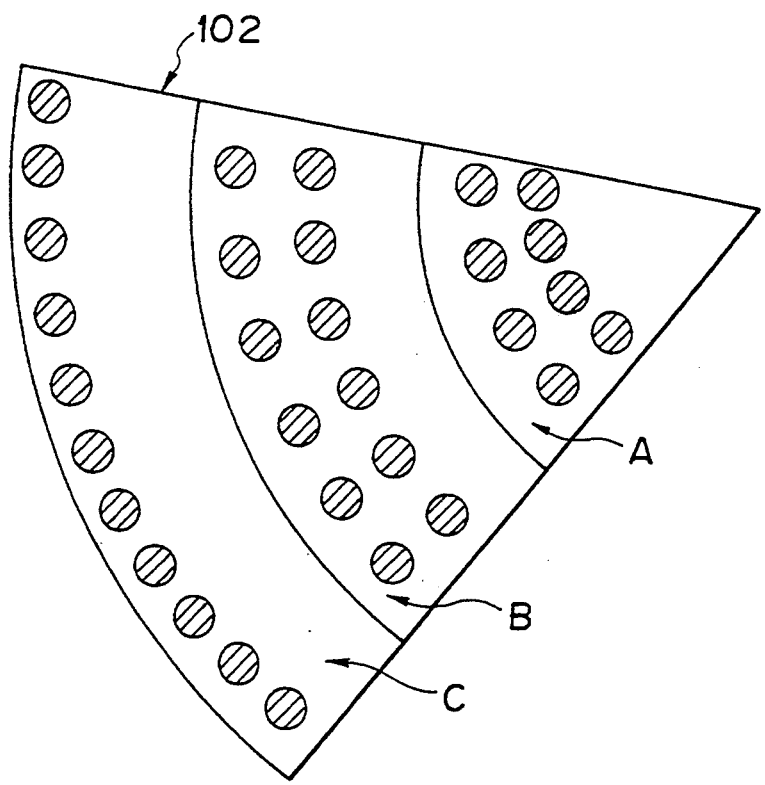
FIG. 8 is a schematic cross-sectional view showing the state in which information signals are recorded on the signal recording region of the magneto-optical disc.

Meanwhile, the signal recording region formed on one major surface of the magneto-optical disc 102 employed in the present apparatus is divided into plural zones, as shown in FIG. 7. That is, the inner most zone of the signal recording region is a first zone A. A second zone B surrounding the first zone A is formed around the outer periphery of the first zone A, a third zone C surrounding the second zone B is formed around the outer periphery of the second zone B and a fourth zone D surrounding the third zone C is formed around the outer periphery of the third zone C. In these zones A to D, digitized information signals are recorded as pits, as shown in FIG. 8. The pits corresponding to the information signals are formed as micro-sized projections, holes or through-holes, formed in one major surface of a disc substrate of the magneto-optical disc 102, of by the difference in the direction of magnetization in the signal recording layer of a magnetic material deposited on the disc substrate of the magneto-optical disc 102. These pits are formed with the minimum pitch equal to 0.6 μm. Servo clock signals are also recorded in these zones A to D.

In the zones A to D of the magneto-optical disc 102, the pits corresponding to the information signals are formed at substantially the same line density. That is, the information signals recorded in the zones A to D are substantially of the same recording pitch. On the other hand, since the magneto-optical disc 102 is rotationally driven by spindle motor 3 at a constant angular velocity, the digital signals corresponding to the pits recorded in the zones A to D become higher in recording frequency at the outer zones than at the inner zones. The servo clock signals are recorded across the inner and the outer peripheries of the signal recording region so as to be read out at a constant clock frequency $f_1$.

In the present magneto-optical disc recording/reproducing apparatus, the servo clock signals are multiplied by frequency conversion ratios a for the respective zones A to D so as to be used as channel clock signals having the frequencies equal to $af_1$. The frequency conversion ratios a are selected to be smaller in the inner zones than in the outer zones. That is the frequency $af_1$ of the channel clock signals is lower in the inner zones and higher in the outer zones so as to be proportionate to the frequencies of the digital signals written and read in the zones A to D. In the present magneto-optical recording/reproducing apparatus, since the frequency $af_1$ of the channel clock signals is proportionate to the frequency of the digital signals, digital signals may be recorded and read on or from the magneto-optical disc 102 based on these channel clock signals. The information signals of the order of 300 megabytes (MB) at the maximum may be recorded on the magneto-optical disc 102.

Figure 9:
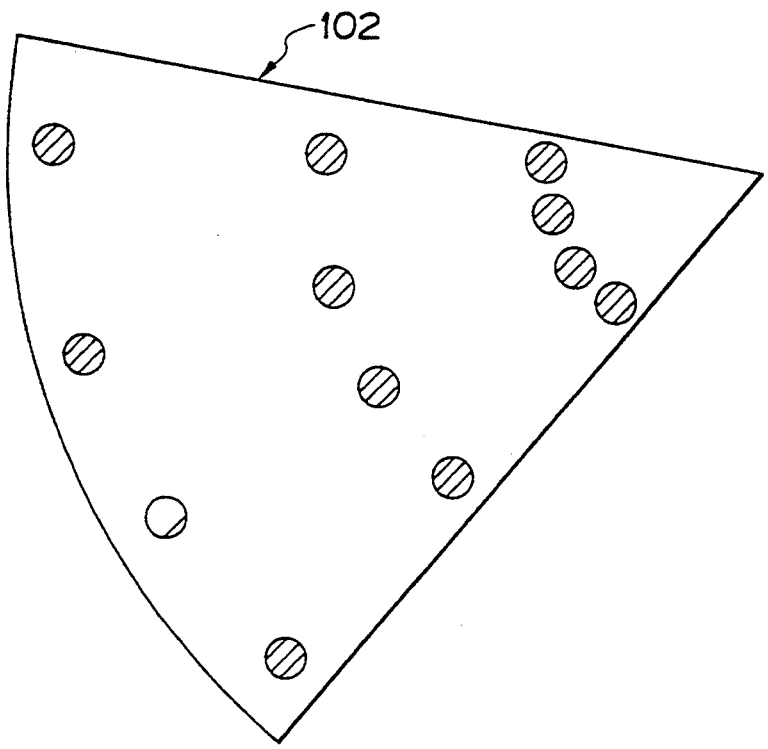
FIG. 9 is partial plan view showing an example of the state of recording the information signals in the signal recording region of the magneto-optical disc shown in FIG. 6.

In the present magneto-optical disc recording/reproducing apparatus, since the signal recording region of the magneto-optical disc 102 is divided into plural zones in which the pits are formed at substantially the constant line density, and the disc 102 is rotated at a constant angular velocity, the recording density of the information signals recorded on the magneto-optical disc 102 may be increased without increasing the size of the apparatus or complicating its structure. That is, if the pits are formed at a constant line density and the frequency of the digital signals read from the magneto-optical disc 102 is to be constant across the inner and the outer peripheries, the magneto-optical disc 102 needs to be rotationally driven so that the portion thereof facing the object lens 55 is driven at a constant line velocity, so that the disc rotating and driving unit, adapted for driving the magneto-optical disc 102, above all, the spindle motor and a motor controlling circuit controlling the spindle motor, become complicated in structure. On the other hand, if the magneto-optical disc 102 is rotationally driven at a constant angular velocity so that the frequencies of the digital signals read from the magneto-optical disc 102 will be constant across the inner and the outer disc zones, it becomes necessary to lower the line density of the pits in the outer zones, as shown in FIG. 9, to render it impossible to improve the recording density of the information signals on the magneto-optical disc 102.

In the magneto-optical recording/reproducing apparatus according to the present invention, a so-called partial response NRZ system is adopted as a signal modulation system for information signals recorded on the magneto-optical disc 102 for increasing the quantity of the information signals recordable on the magneto-optical disc 102 by a factor of about 1.2, that is, to about 360 MB. Besides, the wavelength of the light beam radiated by the semiconductor laser 50 is selected to be 680 nm to increase the quantity of the information signals recordable on the magneto-optical disc 102 by a factor of about 1.316, that is to about 470 MB.

In the optical pickup device in the magneto-optical disc recording/reproducing apparatus according to the present invention, the tracking servo of causing the light beam transmitted through the object lens 55 to follow periodical radial movement of the recording track of the magneto-optical disc (track offsets) accompanying the rotation of the magneto-optical disc 102 is effected by deflecting the light beam incident on the object lens 55 by galvanomirror 53. However, the tracking servo may also be effected by movement of the lens bobbin block 60 guided by the pickup guide shafts 63, 64 or by supporting only the object lens 55 by the object lens driving unit and displacing the object lens radially of the magneto-optical disc 102 with respect to the lens bobbin block 60. Meanwhile, in the magneto-optical disc recording/reproducing apparatus, the magneto-optical disc itself is loaded on the disc table 4 of the disc rotating and driving unit without employing the disc cartridge. The result is that there is no necessity of providing a space for accommodating the disc cartridge within the outer casing 1 and consequently the magneto-optical disc accommodated in the outer casing 1 may be increased in size to a size substantially inscribing the rectangular outer casing 1.

Figure 11:
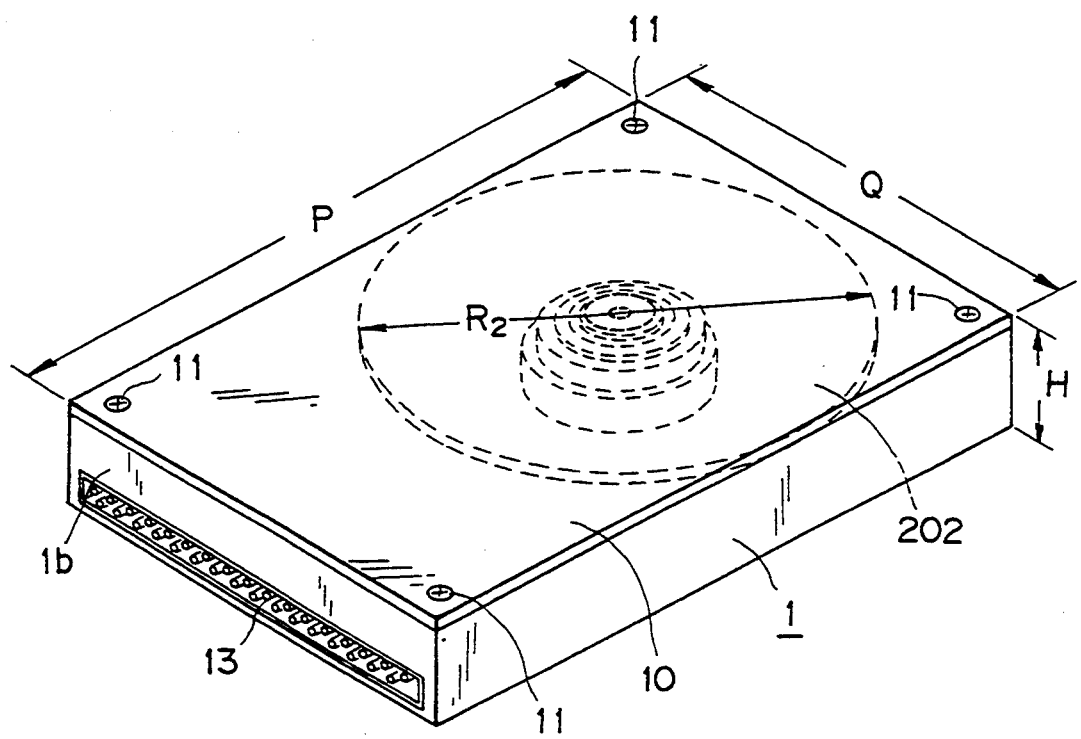
FIG. 11 is a perspective view showing a modification of the magneto-optical disc recording/reproducing apparatus according to the present invention.

If the outer casing 1 has the width Q equal to 101.6 mm, the depth P equal to 145 mm and the height H of 25.4 mm, as described previously, a magneto-optical disc 202 may be increased to a size having a diameter $R_2$ equal to 95 mm, as shown in FIG. 11. With the magneto-optical disc 202 having the diameter $R_2$ of 95 mm, the disc region from an inner disc zone corresponding to the diameter of 40 mm to an outer disc zone corresponding to the diameter of 90 mm becomes the signal recording region. By increasing the size of the magneto-optical disc 202 in this manner, its signal recording region may be increased to increase the recording capacity of the recording information signals. The out, side diameter of the disc rotating and driving units, on which the magneto-optical disc 202 is mounted integrally, is 95 mm corresponding to the outside diameter of the magneto-optical disc 202.

In the magneto-optical disc recording/reproducing apparatus according to the present invention, since the magneto-optical disc, disc rotating and driving means, optical head means, external magnetic field generating means and controlling means are contained in the outer casing having the width not more than 101.6 mm, the depth of not more than 145 mm and the height of not more than 25.4 mm, a small-sized disc may be housed within a small-sized outer casing to permit recording of a larger quantity of information signals.

Above all, since a disc substrate having a thickness of not more than 1.2 mm and a diameter of not more than 95 mm is used for the magneto-optical disc accommodated in the outer casing, and the signal recording region of the disc is divided into plural signal recording zones having substantially an equal line recording density from the inner periphery to the outer periphery of the disc, the recording capacity may be increased further.

Since the optical head means is constituted by a stationary optical system and a movable optical system, it becomes possible to reduce the size of the means for driving the optical head means to reduce the size of the apparatus further.

What is claimed is:

1. A magneto-optical disc recording and reproducing apparatus comprising:
    rotational driving means for driving a magneto-optical disc at a substantially constant angular velocity, the magneto-optical disc having a thickness of substantially 1.2 mm, the magneto-optical disc further having a signal recording region formed on the substrate, the signal recording region divided from an inner periphery to an outer periphery into plural concentric signal recording zones located at increasing radial distances from a center of the magneto-optical disc, each signal recording zone having a substantially equal line recording density and containing servo clock signals encoded such that linear distances between the servo clock signals along circular tracks of the magneto-optical disc increase as the radial distance of each track from the center of the magneto-optical disc increases, whereby the servo clock signals recorded at different radial distances from the center of the magneto-optical disc are reproduced at a substantially constant frequency;
    optical means for radiating a light beam onto the magneto-optical disc and for receiving light returning from the magneto-optical disc;
    magnetic field generating means for applying a magnetic field when information signals are being recorded on the magneto-optical disc;
    controlling means for controlling the rotational driving means, optical means, and the magnetic field generating means, the controlling means further for convening the substantially constant frequency reproduced from the servo clock signals for use as plural channel clock frequencies for reproducing and recording signals in the signal recording zones, each signal recording zone having one corresponding channel clock frequency, such that the channel clock frequencies of signal recording zones located at larger radial distances from the center of the magneto-optical disc are higher than channel clock frequencies of signal recording zones located at smaller radial distances from the center of the magneto-optical disc; and
    an outer casing including at least a lower chassis in parallel with the magneto-optical disc, the outer casing accommodating the magneto-optical disc, the rotational driving means, the optical means, the magnetic field generating means, and the controlling means.

2. The magneto-optical disc recording and reproducing apparatus as defined in claim 1 wherein the optical means include
    a fixed optical system at least including a light source for emitting the light beam, a photodetector, and optical elements for detecting focusing errors, the fixed optical system located adjacent to the magneto-optical disc within the outer casing;
    a movable optical system located adjacent to a lower optical surface of the magneto-optical disc, the movable optical system including
        lens means mounted movably along a radius of the magneto-optical disc for converging the light beam onto the magneto-optical disc, and
        redirection means for receiving the light beam emitted by the light source in the fixed optical system and redirecting the light beam onto the object lens, and for receiving light collimated by the object lens and redirecting the collimated light toward the fixed optical system; and feed means for moving the movable optical system radially across the magneto-optical disc.

3. The magneto-optical disc recording and reproducing apparatus as defined in claim 2 wherein the feed means includes a feed motor and a pair of parallel guides in parallel with the magneto-optical disc and the lower chassis for guiding the movable optical system radially across the magneto-optical disc, and wherein the optical means further comprises optical support means for movably supporting the movable optical system along the parallel guides, the support means having a lateral side along each of the parallel guides; and rolling means attached to the optical support means for rolling on and holding the parallel guides, the rolling means including at least two rows of at least three side rolls, each row of guide rolls positioned along each lateral side of the optical support means, such that at least one guide roll of each row of guide rolls extends upward at an angle to rest against an upper surface of one of the parallel guides and the remaining guide rolls in the same row of guide rolls extend downward at an angle to rest against a lower surface of the same parallel guide.

4. The magneto-optical disc recording and reproducing apparatus as defined in claim 2 wherein the lens means comprises a single aspherical lens.

5. The magneto-optical disc recording and reproducing apparatus as defined in claim 2 wherein the magneto-optical disc has a storage capacity of not less than 300 megabytes and not more than 470 megabytes.

6. A magneto-optical disc recording and reproducing apparatus comprising:

an outer casing including at least a lower chassis;

rotational driving means within the outer casing for driving a magneto-optical disc at a substantially constant angular velocity, the magneto-optical disc having a thickness of substantially 1.2 mm, the magneto-optical disc further being parallel to the lower chassis and having a substrate and a signal recording region formed on the substrate, the signal recording region containing plural concentric signal recording zones located at increasing radial distances from the center of the magneto-optical disc, each signal recording zone having a substantially equal line recording density and containing servo clock signals encoded such that linear distances between the servo clock signals along circular tracks of the magneto-optical disc increase as the radial distance of each track from the center of the magneto-optical disc increases, whereby the servo clock signals recorded at different radial distances from the center of the magneto-optical disc are reproduced at a substantially constant frequency;

optical means for radiating a light beam onto the magneto-optical disc and for receiving light returning from the magneto-optical disc, the optical means including a fixed optical system including at least a light source for emitting a light beam, a photodetector, and optical elements for detecting focusing errors, the fixed optical system located behind the magneto-optical disc within the outer casing;

a movable optical system located adjacent to a lower optical surface of the magneto-optical disc, including an object lens mounted movably along a radius of the magneto-optical disc for converging the light beam onto the magneto-optical disc and for collimating light returning from the magneto-optical disc; and redirection means for receiving the light beam emitted by the light source in the fixed optical system and redirecting the light beam onto the object lens, and for receiving light collimated by the object lens and redirecting the collimated light toward the fixed optical system;

feed means for moving the movable optical system radially across the magneto-optical disc, the feed means including
a feed motor and
a pair of parallel guides in parallel with the magneto-optical disc and the lower chassis;

optical support means for movably supporting the movable optical system along the parallel guides, the support means having a lateral side along each of the parallel guides; and rolling means attached to the optical support means for rolling on and holding the parallel guides, the rolling means including at least two rows of at least three guide rolls, each row of guide rolls positioned along each lateral side of the optical support means, such that at least one guide roll of each row of guide rolls extends upward at an angle to rest against an upper surface of one of the parallel guides and the remaining guide rolls in the same row of guide rolls extend downward at an angle to rest against a lower surface of the same parallel guide;

magnetic head means above the magneto-optical disc and opposite the movable optical system for applying a magnetic field onto the magneto-optical disc when recording information signals on the magneto-optical disc;

magnetic head support means for supporting the magnetic head means, the magnetic head means being supported at a distal end of the magnetic head support means, the magnetic head support means extending around an edge of the magneto-optical disc and being attached to the optical support means at a proximal end of the magnetic head support means, so that the magnetic head support means and the magnetic head means move in unison with the movable optical system; and controlling means for controlling the rotational driving means, the feed means, the optical means, and magnetic head means, the controlling means further for convening the substantially constant frequency reproduced from the servo clock signals for use as plural channel clock frequencies for reproducing and recording signals in the signal recording zones, each signal recording zone having one corresponding channel clock frequency, such that the channel clock frequencies of signal recording zones located at larger radial distances from the center of the magneto-optical disc are higher than channel clock frequencies of signal recording zones located at smaller radial distances from the center of the magneto-optical disc.

7. The magneto-optical disc recording and reproducing apparatus of claim 6, further comprising a partial response NRZ system for performing signal modulation of signals recorded on the magneto-optical disc, and wherein the light source comprises a laser emitting a light beam having a the wavelength of substantially 680 nanometers.

* * * * *

UNITED STATES PATENT AND TRADEMARK OFFICE
CERTIFICATE OF CORRECTION

PATENT NO.   :   5,428,583
DATED        :   June 27, 1995
INVENTOR(S)  :   Kiyoshi Ohmori et al It is certified that error appears in the above-indentified patent and that said Letters Patent is hereby corrected as shown below:

At column 11, line 39, "out," should read --out---.

At column 12, line 32, "convening" should read --converting--.

At column 14, line 49, "convening" should read --converting--.

Signed and Sealed this

Tenth Day of October, 1995

Attest:

BRUCE LEHMAN

Attesting Officer        Commissioner of Patents and Trademarks